United States Patent
Wharton

[11] 3,794,749
[45] Feb. 26, 1974

[54] METHOD FOR CONTROLLING CONTAMINATION IN GAS INSULATED TRANSMISSION SYSTEMS

[75] Inventor: Lennard Wharton, Newtown Square, Pa.

[73] Assignee: I-T-E Imperial Corporation, Spring House, Pa.

[22] Filed: May 9, 1973

[21] Appl. No.: 358,631

[52] U.S. Cl................ 174/28, 29/624, 174/16 B, 174/99 B
[51] Int. Cl. ............................................ H01b 9/04
[58] Field of Search.. 174/28, 29, 8, 10, 16 B, 99 B; 29/592, 624

[56] References Cited
UNITED STATES PATENTS

| | | | |
|---|---|---|---|
| 3,740,925 | 6/1973 | Gothard | 174/16 B UX |
| 3,688,015 | 8/1972 | Graybill | 174/99 B |
| 3,646,245 | 2/1972 | Swerdlow | 174/16 B |
| 3,639,671 | 2/1972 | Clark | 174/16 B |

*Primary Examiner*—Bernard A. Gilheany
*Assistant Examiner*—A. T. Grimley
*Attorney, Agent, or Firm*—Ostrolenk, Faber, Gerb & Soffen

[57] ABSTRACT

The deleterious affect of aluminum and other conductive particles within a compressed gas insulated transmission system is minimized by treating the system with an oxidixing agent.

15 Claims, 1 Drawing Figure

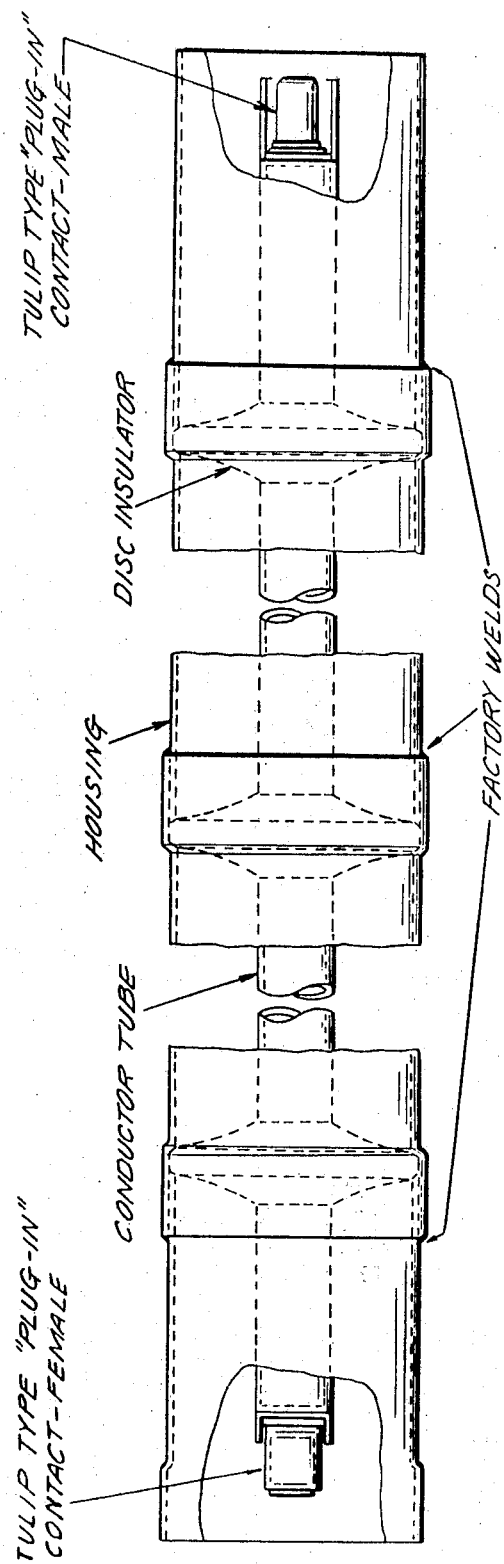

3,794,749

METHOD FOR CONTROLLING CONTAMINATION IN GAS INSULATED TRANSMISSION SYSTEMS

BACKGROUND OF THE INVENTION

Bus systems as described in Graybill, U.S. Pat. No. 3,546,356 ("Elbow construction for high voltage compressed gas-insulated conductors") and Graybill, U.S. Pat. No. 3,573,341 ("Compressed gas-insulated conductors employing expanded tubing cover design expansion joints"), assigned to the assignee of the present invention, are employed in high voltage power transmission systems in compact sub-stations. Such bus systems typically are comprised of an inner or central conductor concentrically arranged within a tubular conductive housing in which the spacing is maintained between the conductor and housing by means of suitable insulating spacers arranged at spaced intervals along the bus run. The conductors are metal, e.g., copper, steel, nickel plating, and usually aluminum. Since the isolated phase bus is designed to operate at extremely high power and voltage ratings, the bus is preferably filled with a gas such as sulfurhexafluoride ($SF_6$) which has the characteristics of providing extremely high dielectric strength within the bus.

In spite of the arrangement of the gas filled bus, a very high voltage gradient exists in the compressed gas filled space between the central high voltage conductor tube and the concentrically arranged grounded tubular conductive housing. The voltage gradient may be of the order of 85 volts per mil or higher for normal operating voltages and as high as 350 volts per mil or more during voltage surges which the system must withstand without flashing over internally. Electronegative gases such as $SF_6$ have the ability of absorbing free electrons in the gas filled space, thereby tending to prevent the electron avalanche type of flashover from occurring at these voltages due to ionization by electron collision. As with other gases, the flashover voltage increases with the gas density, i.e., with the number of molecules per unit volume. However, it is well known that the presence of conducting particles within the medium of the $SF_6$ can drastically lower the flashover voltage. Such particles can pick up a charge and are thereby accelerated by the electric field, being drawn toward the conductor of opposite polarity from that of the charge so as to be accelerated by the electric field. A number of changes in the charge picked up by the particles can occur causing the particles to travel back and forth between the electrodes which can result in generation of small sparks and, in quantity, can lead to a flashover condition. Additionally, the high voltage gradient existing within the bus run, i.e., between the central conductor and grounded housing, can cause such rapid acceleration of the charged particles as to cause a significant collision to occur whereby the particles, upon colliding with either of the two internal surfaces, are caused to free other particles which may create an "avalanching" effect.

It is therefore necessary to take every possible precaution in the fabrication, assembly, shipment and installation of such bus system in order to eliminate any metallic or carbon particles in the size range of about 1 micron to about 3 millimeters in diameter.

Various techniques have been developed to collect and confine such particles, however, all such techniques require the addition of components with the bus to achieve these results thereby increasing the fabrication operation and costs of such bus sections. See, for example, U.S. Pat. Nos. 3,515,909 and 3,515,939.

In U.S. Pat. No. 3,688,015, assigned to the assignee of the present invention, it is pointed out that the extruded aluminum tubes used for both the conductor and housing have aluminum and graphite particles embedded in their surfaces, particularly in their inner surfaces. These particles cannot be removed by wiping, washing with conventional solvents, and the like. Some of the particles are released into the gas during the evacuation process necessary for filling the bus with $SF_6$, by vibration, by the high voltage electric field, or by various combinations of these factors. In order to remove these particles, the conductive surfaces are uniformly etched, washed, treated with oxidizing agent to remove the black residual film, washed again and then dried under dust-free conditions. I have now discovered a new, simple method for accomplishing the same purpose, i.e., minimizing or eliminating the affect of particles within a gas insulated transmission system.

It is accordingly the object of this invention to provide a method for treating aluminum compressed gas insulated transmission systems so as to minimze or eliminate the effect of particles within the system and thereby maintain the integrity of the dielectric pattern within the system.

This and other objects of the invention will become apparent to those skilled in the art from the following detailed description and drawing in which the sole FIGURE shows one typical isolated phase bus run which may be treated by the method of this invention.

SUMMARY OF THE INVENTION

The present invention relates to compressed gas insulated transmission systems and more particularly to a method of treating compressed gas insulated bus systems to minimize or eliminate the effect of particles therein and thereby eliminate or significantly reduce deterioration of the dielectric stress within the compressed gas insulated bus system.

DESCRIPTION OF THE PREFERRED EMBODIMENTS

The sole FIGURE shows one typical isolated phase bus run. The conductive housing is normally at ground potential while the central conductor can be at 69–1,500 kilovolts. Particles which may be present on the confronting interior surfaces of the bus sections can acquire a charge (either positive or negative) causing the charged particles to be attracted to the oppositely polarized surface. The acceleration of such particles can cause a collision with the surface resulting in the breakup or the release of additional particles and thereby causing a "pyramiding" effect. The presence of a quantity of such particles can cause sparking and/or a flashover condition. Those skilled in the art will recognize that this problem is not limited to isolated phase bus systems but can occur in any non-segregated or segregated bus system in which the central conductor is at 69–1,500 kilovolts.

In order to minimize or eliminate the effect of the particles, the bus system is treated with an oxidizing agent, preferably a gaseous oxidizing agent such as oxygen, chlorine, sulfur dioxide, hydrogen chloride, nitric oxide and the like. At present, the preferred gaseous oxidizing agents are chlorine and oxygen and between these two gases, the chlorine appears preferably because of its more rapid reaction at room temperature. The bus system is treated with the oxidizing agent for a time sufficient to provide the outer surface of the aluminum metal with a layer of an aluminum salt. In other words, treatment is continued for a time sufficient to allow at least the outermost layer of aluminum metal to react with the oxidizing agent to form the corresponding aluminum salt, such as aluminum oxide and aluminum chloride. Of course, mixtures of oxidizing agents and/or catalysts and diluents can be employed.

The oxidizing agent treatment can be accomplished before or after the aluminum housing and aluminum central conductor have been assembled into the isolated phase bus. For economic reasons, however, it is preferred to treat both conductors in a single step, i.e., after they are assembled into the bus unit. The oxidizing agent treatment can also be accomplished before or after the insulating gas, for example, $SF_6$, is introduced into the isolated phase bus. Indeed, the oxidizing agent treatment can be periodically applied to the bus during operation if desired. The treatment may be carried out while the bus is in an energized state so that the oxidizing agent reacts with the confronting interior faces of the bus sections and with any free aluminum particles therebetween.

The advantages of the treatment of this invention can be appreciated in view of the following considerations. Aluminum is used for the central conductor and housing tubes of the bus because of its excellent electrical conductivity. Aluminum salts have a very much lower conductivity and can act as insulation. The aluminum salt coating on the confronting interior surfaces of the bus sections thus serve as insulation for the conductors and aluminum particles contacting the aluminum salt will acquire a charge (either positive or negative) sufficient to cause the resulting charged particles to be attracted to the opposite polarized surface at a relatively slow rate. When the aluminum particles additionally have a surface layer of aluminum salt or are substantially converted to an aluminum salt, the acquisition of the charge will be slowed even more. Heretofore, the art has attempted to establish a similar condition by providing the inner surface of the conductive housing with a layer of rubber insulation. See, e.g., U.S. Pat. No. 3,515,909. Formation of the aluminum salt layer has the additional advantage in that it can be expected to round off or coat sharp projections on the conductor surfaces and thereby reduce the probability of corona.

It will be recognized by those skilled in the art that the reaction conditions must be adjusted for the particular gaseous oxidizing agent employed. For example, chlorine gas has a different reactivity than hydrogen chloride and the time, temperature, pressure and concentration used for flushing the bus must be adjusted accordingly. The reaction rates may be sensitive to the presence of moisture. Additionally, it will be recognized that reactions on metal surfaces do not proceed uniformly across the surface but are most rapid in localized areas or "active sites." For example, the reaction between aluminum and chlorine does not proceed uniformly across the surface at a temperature below about 300° C. As a result, it appears that the oxidizing agent treatment of the present invention acts primarily on the small aluminum particles rather than the aluminum surfaces of the confronting conductors.

The following Example illustrates the process of the invention. An isolated phase bus system having a central conductor surrounded by a concentrically aligned conductive housing, both of extruded aluminum, was assembled in the conventional manner. The gas insulating volume was then evacuated and then connected to cylinders of chlorine gas. The gas was released from the cylinders into the bus and allowed to react for approximately 24 hours, and then the chlorine was pumped out of the bus. Finally, the gas insulating volume was filled with $SF_6$.

Those skilled in the art will recognize that aluminum upon contact with the air will obtain a surface layer of aluminum oxide. Since bus systems are exposed to the air during fabrication, it will also be apparent that the normally occurring aluminum oxide coating on aluminum is not sufficient to avoid the problem to which the present invention is directed. However, by treating such bus systems according to the present invention, an aluminum salt coating is provided which is sufficient to eliminate or minimize the deleterious affect of aluminum particles therein. The difference between the usual aluminum oxide coating and the coating obtained according to the present invention can be appreciated from the following experiment.

5 g of aluminum dust, exposed to the air, was placed in a 125 ml Erlenmeyer flask. The flask was then evacuated and connected to a cylinder containing chlorine gas. After the flask was filled with the gas, it was shaken for 1 hour on a wrist action shaker so that the dust and gas were in good contact. The pressure was maintained at one atmosphere. The aluminum dust particles which has been exposed to the chlorine gas were found to have increased in weight by 3.5 percent.

Various changes and modifications can be made in the process and products of this invention without departing from the spirit and the scope thereof. The various embodiments disclosed herein serve to further illustrate the invention but are not intended to limit it. Similarly, theoretical considerations have been set forth in order to assist in understanding the invention but it is not intended to be limited thereby.

The embodiments of the invention in which an exclusive privilege or property is claimed are defined as follows:

1. A bus system comprising a tubular metal conductive housing and a central metal conductor concentrically arranged within said housing, wherein the free metal particles therebetween have a coating of a metal salt thereon sufficient to minimize the deleterious effect of said particles within said system.

2. The bus system of claim 1 wherein said metal is aluminum.

3. The bus system of claim 2 wherein the space between the housing and the conductor is filled with an insulating gas.

4. The bus system of claim 3 wherein the insulating gas is $SF_6$.

5. The bus system of claim 3 wherein said system is an isolated phase bus system.

6. A method of treating metal gas insulated transmission systems so as to minimize the deleterious effect of free metal particles therein which comprises contacting said system with an oxidizing agent whereby the free metal particles are provided with a coating of a metal salt sufficient to minimize the deleterious effect of said particles within said system.

7. The method of claim 6 wherein said metal is aluminum.

8. The method of claim 7 wherein the tubular aluminum conductive housing and central aluminum conductor comprising said gas insulated transmission systems are contacted with a gaseous oxidizing agent before being assembhed into the system.

9. The method of claim 7 wherein said system is treated with a gaseous oxidizing agent.

10. The method of claim 9 wherein the gaseous oxidizing agent is selected from the group consisting of oxygen, chlorine, sulfur dioxide, hydrogen chloride, and nitric oxide.

11. The method of claim 10 wherein the oxidizing agent is chlorine gas.

12. A method of treating an isolated phase bus system comprising a tubular aluminum conductive housing and a central aluminum conductor concentrically arranged within said housing which comprises contacting said bus system with a gaseous oxidizing agent whereby the free aluminum particles within said system are provided with a coating of an aluminum slat sufficient to minimize the deleterious effect of said particles within said system.

13. The method of claim 12 wherein the gaseous oxidizing agent is injected into the gas insulating volume between said housing and central conductor.

14. The method of claim 13 wherein the gaseous oxidizing agent is selected from the group consisting of oxygen, chlorine, sulfur dioxide, hydrogen chloride, and nitric oxide.

15. The method of claim 14 wherein the oxidizing agent is chlorine gas.

* * * * *